UNITED STATES PATENT OFFICE.

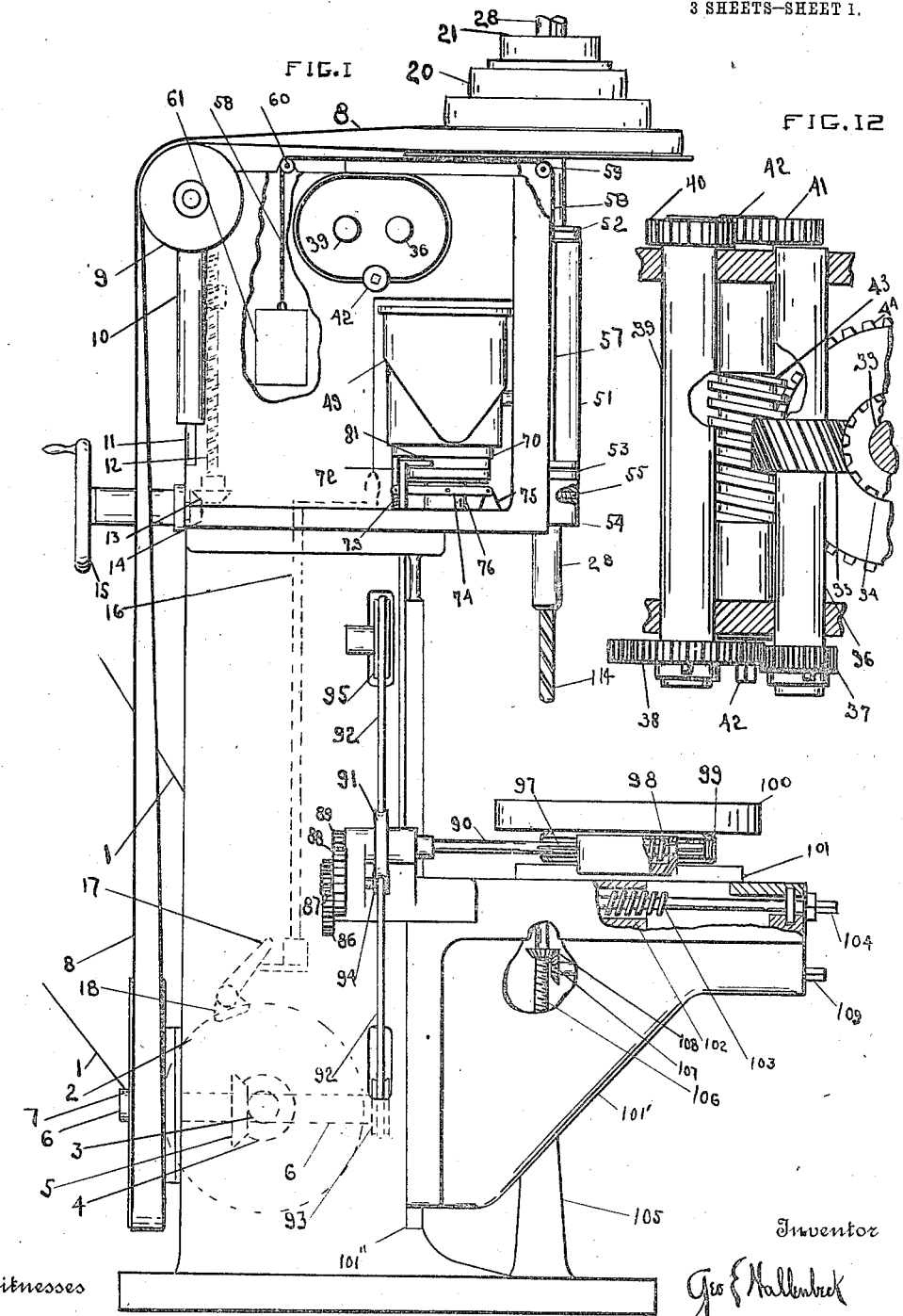

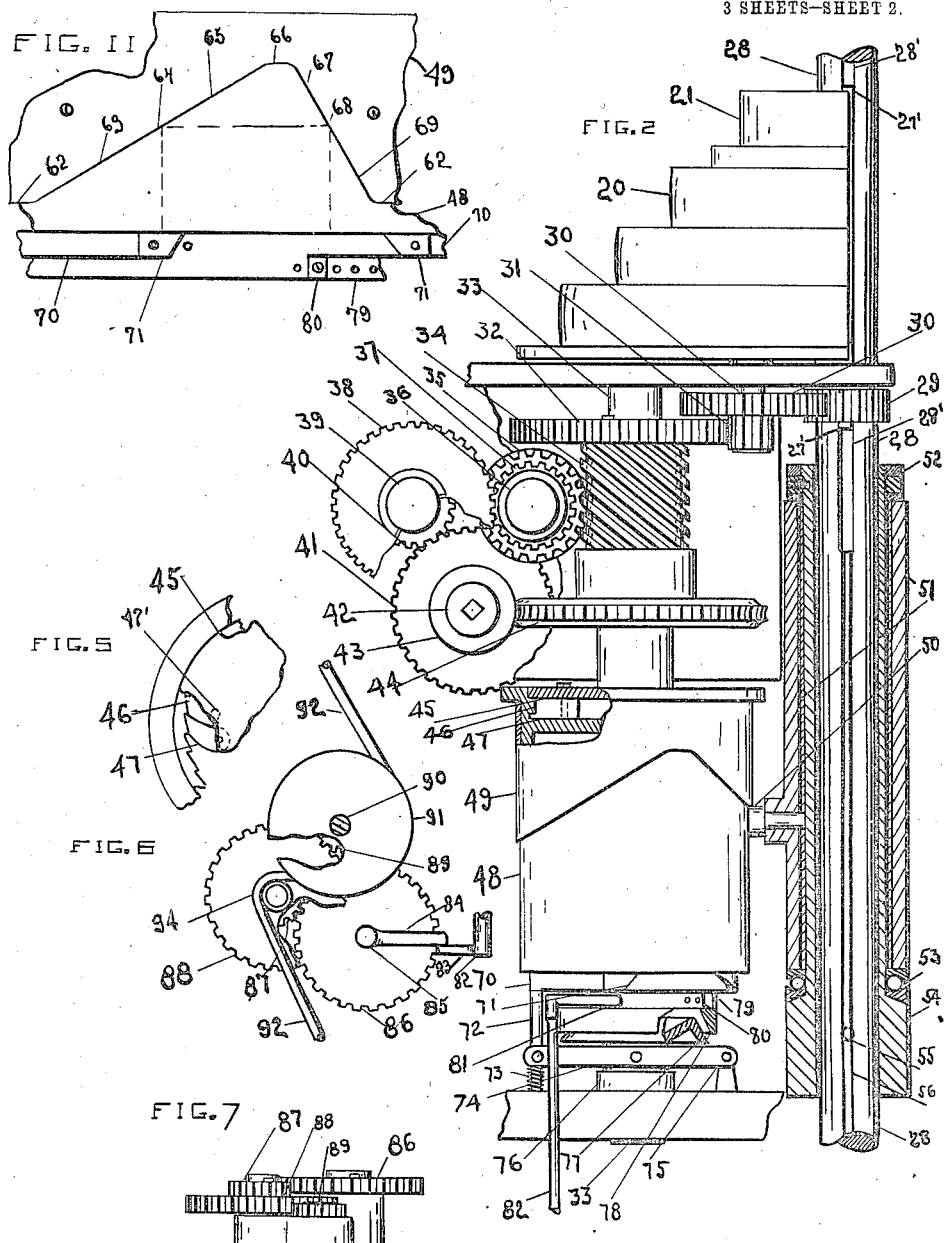

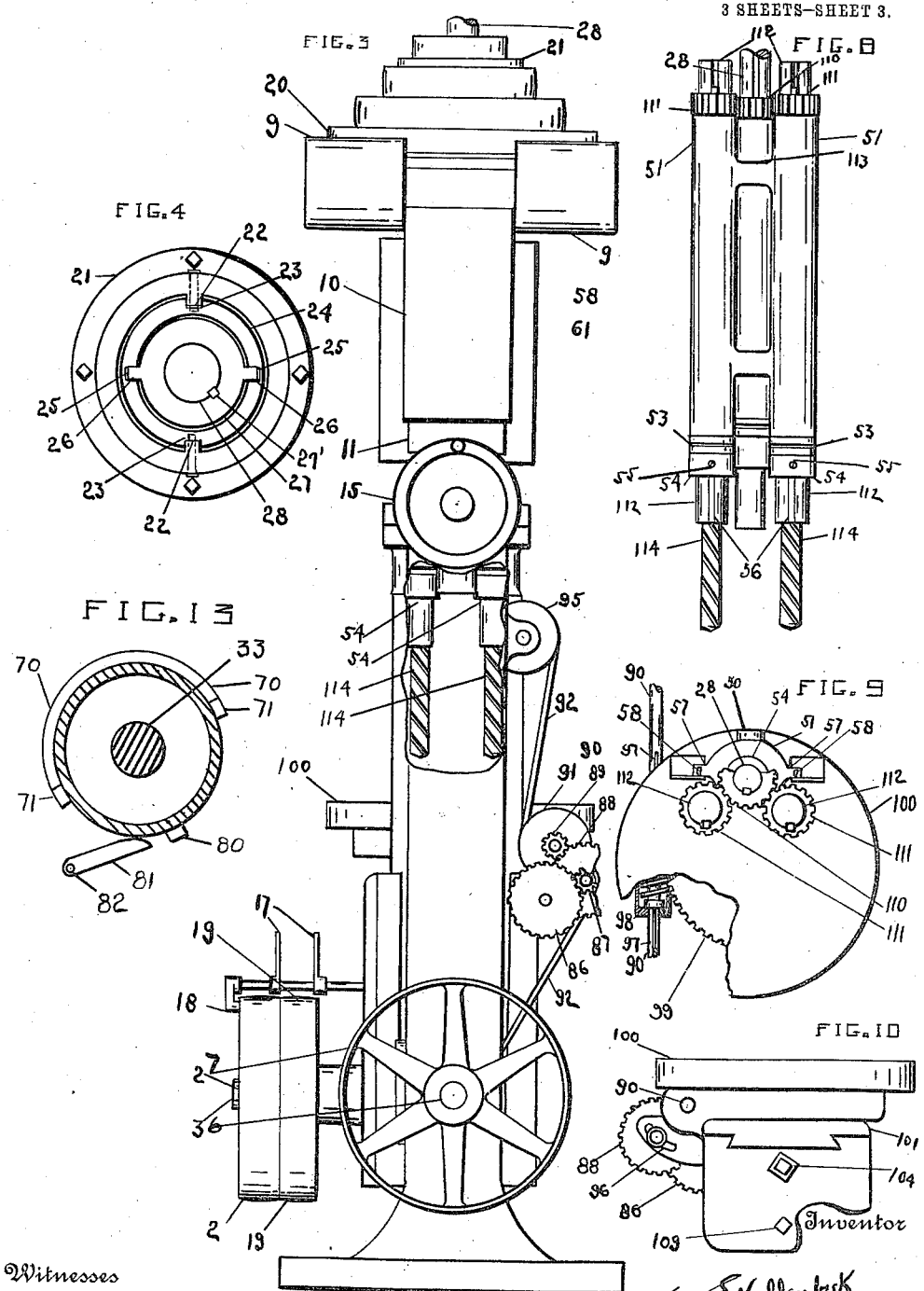

GEORGE E. HALLENBECK, OF TOLEDO, OHIO, ASSIGNOR TO BAKER BROTHERS, OF TOLEDO, OHIO, A FIRM.

MACHINE-TOOL.

1,093,265. Specification of Letters Patent. Patented Apr. 14, 1914.

Application filed June 5, 1911. Serial No. 631,262.

*To all whom it may concern:*

Be it known that I, GEORGE E. HALLENBECK, a citizen of the United States, residing at Toledo, Lucas county, Ohio, have invented new and useful Machine-Tools, of which the following is a specification.

This invention relates to features of mechanism adjustment and control.

This invention has utility when embodied in a machine tool, particularly of type of automatic drill.

Referring to the drawings, Figure 1 is a side elevation of an embodiment of the invention in an automatic drill, with parts broken away, Fig. 2 is a fragmentary detail on an enlarged scale of features of the control for the machine tool, Fig. 3 is a rear elevation of the machine, with parts broken away, showing multiple tool attachment thereto, Fig. 4 is a plan view of the driving head for the work spindle or tool carrier, Fig. 5 is a fragmentary detail in plan of the silent pawl driving connection allowing variable speed operation of the tool reciprocating cam, Fig. 6 is an elevation, with parts broken away, of a portion of the trip device effecting intermittent operation of the work carrying table or platform, Fig. 7 is a plan view of the device of Fig. 6, Fig. 8 is a detail in front elevation of the plural or multiple tool carrier, Fig. 9 is a plan view of the carrier of Fig. 8, Fig. 10 is an end elevation of the work holding table, Fig. 11 is a development of the tool reciprocating cam and association of other features of control therewith, Fig. 12 is a plan view, with parts broken away of the speed reduction transmission for slow rotation of the cam, and Fig. 13 is a horizontal section taken through Fig. 2 on a line just above the arm 81 and looking in the direction of said arm.

The driving belt 1, passing over fast pulley 2 drives the shaft 3 in the lower portion of the drill frame, which shaft 3 carries bevel gear 4 in mesh with bevel gear 5 upon shaft 6, having thereon the pulley 7. The pulley 7 has belt 8 passing thereabout and extending upward over a pair of idlers 9 mounted on frame 10 reciprocable along guide 11, through operation of screw 12, from bevel pinions 13, 14, as actuated by the hand wheel 15. Vertically disposed hand oscillated shaft 16 carries belt shifting fingers 17 and brake shoe 18, which latter is held against the fast pulley 2 to stop the machine when the belt 1 is shifted by the fingers 17 from this fast pulley 2 upon the loose pulley 19. While in converse operation, the shifting of the belt 1 from loose pulley 19 upon loose pulley 2, simultaneously releases the brake 18 to allow of driving of the drill.

Rotation of the hand wheel 15 serves to permit variations in the normal driving speed of the drill, by shifting the belt to different steps of the cone pulley, and also takes up variations in belt length due to belt 8 engaging the different steps of the cone pulley 20, by travel of the idlers in such a direction as to the pulleys 7 and 20 as to compensate for differing diameters of steps of the latter. This pulley 20, has finger coupling connection thereon, comprising the plate 21 having a pair of diametrically opposing lugs 22, engaging with slight radial clearance the notches 23 in the ring 24, which has also internal notches 25 diametrically disposed at right angles as to the external notches 23. These radial notches 25 have slight radial clearance as to the projecting lugs 26 of the collar 27 having fixed therein the spline 27' slidable in the way 28' of the tool carrier shaft 28. These lugs and notches fit snugly for rotative driving with a minimum of lost motion, while the radial clearance permits the driven parts to properly line up at high speeds with a minimum of wear to the structure. Also held by the spline 27' to be rotated by the shaft 28, is the pinion 29 in mesh with the gear wheel 30 having fast thereto the pinion 31 in mesh with the gear wheel 32 keyed to shaft 33 to drive the spiral gear 34 in mesh with the gear 35 on the shaft 36 at right angles to the shaft 33. This shaft 36 has removable pinion 37 thereon in mesh with removable gear 38 upon the parallel shaft 39. Interchange of this pinion and gear, or substitution of different sizes thereof, makes possible ready variation of speed of this transmission from shaft 33. At the opposite end of shaft 39 from gear 38, is mounted the pinion 40 in mesh with the gear wheel 41 on the parallel shaft 42. This gear and pinion may be removable for speed train adjustment as the gears 37, 38. Shaft 42 has a squared end permitting of application of a wrench or crank for manual shifting of the mechanism. Shaft 42 in normal driving operates through the worm 43 thereon to drive the worm wheel 44 loosely mounted on the shaft 33. This worm wheel 44 carries a flange 45 lying adjacent the annular ratchet 46 engaged by the noiseless pawl 47 carried by the flange 45. The ratchet 46 is in the form of a rim at the upper extremity of the drum 48 which has mounted thereon the removable cam 49. When the speed of the drum 48 exceeds that of the pawl carrying flange 45, the upper head of the drum 48 noiselessly urges the pawl 47 against the stop 47' of the flange 45, while when the flange exceeds in speed the drum 48, the movement of the flange 45 in advance of the drum head causes the friction of the drum head upon the pawl 47 to work it outward into engagement to drive the ratchet 46.

The cam 49 serves as a reciprocating means by engaging the roller 50 mounted upon the sleeve member 51, which by means of lock nut 52 at its upper extremity and roller thrust bearing 53 at its lower extremity, is held against reciprocation as to the relatively rotatable inner sleeve member 54, having set screw 55 coacting with the flattened way 56 on the tool carrying shaft 28. This screw locks the sleeve 54 for rotation with shaft 28 at any adjusted position therealong, the rotation being imparted to shaft 28 by spline 27', while the reciprocation is imparted to this shaft 28 through this sleeve 54 from the cam engaging sleeve 51. This sleeve 51 is provided with a pair of laterally extending wings 57 throughout its length, as shown in Fig. 9, which wings engage guides in the drill frame structure, to effectually hold the tool carrier in alined position with freedom of reciprocation. The front attaching plates allow of ready mounting and removal of sleeve 51. To hold the tool normally upward away from the work and so that action of the cam 49 is always positive, gravity means is provided to keep the shaft 28 and its carried parts lifted. This means comprises lines, ropes or chains 58 extending upward from the wings 57 over the guide rollers 59, 60 to the counterweight 61.

Referring to the development of the cam 49, Fig. 11: Extending to the lower dwell 62 is gradual incline 63, which may be considered in a particular operation between points 62 and 64 as period of slow speed working feed of the tool into the work. The travel to point 64, down incline 65, from dwell 66 and up steep incline 67 from point 68 may be considered a rapid travel period occurring before the slow speed drilling occurs during stage 63 from point 64 to point 62. The dwell at point 62 permits the tool to clear the stock at its limit and leave a finished face, in the instance of face drilling. From this dwell 62, the drum is rotated at its slow speed rate, but quite rapidly withdrawn from the stock by the steep incline 69. So establishing longitudinal cam 70 by its adjustable termini 71 as to time in the particular instance with tool travel just before entering the stock, then for slower drive or feed into the stock, this cam acting upon the pin 72 forces it down against the action of the spring 73 to rock the lever 74 mounted upon the fulcrum bracket 75, and thus carries the sleeve 76 on shaft 33 to remove the clutch face 77 from the clutch face 78 fixed with the drum 48, thus disconnecting the high speed driving of the drum 48 directly from shaft 33 as driven by pinion 31, to a slower speed drive through the train on shafts 36, 39, 42, and pawl 46, while the tool is working through the stock in its feed along incline 63, with high speed drive across dwell 62 and out of stock along incline 69 as drawn by the counterweight 61. At this stage 62 the oppositely acting terminus 71 of cam 70 engages the pin, or rather allows the pin 72 to ride upward as actuated by spring 73 to throw clutch face 77 into engagement with the clutch face 78, so that the sleeve 76 rotatable with the shaft 33 directly drives the drum 48 at this higher speed, while the tool is being lifted out of the stock from dwell 62 and away from the stock from point 68, rapidly up incline 67, over upper dwell 66, and more gradually fed down the incline 65 to the stock at point 64 for a repetition of the slower feed travel into the work. To effect movement of the work to present a new portion for this second operation, a resetting of the stock occurs while the tool is out of the material. As the drill leaves the stock at point 68, the cylindrical portion 79 has adjustably mounted for action at this stage, the abutment 80, upon which rides the arm 81 to oscillate the vertical shaft 82 sufficiently to throw the arm 83 to free the finger 84 for a single rotation of the shaft 85 as actuated by train of gears 86, 87, 88, 89, which latter is on shaft 90 driven by the pulley 91 which is actuated by the belt 92 passing over the continuously driven pulley 93 on the shaft 3. This belt 92 passes over the idler 94 to hold it in proper arc of contact with the pulley 91. The upper reaches of the belt 92 pass over the pulley 95 mounted in the frame, so that movement of this gear train with the up and down adjustments of the work table or platform may be automatically taken care of. Gear 88 of the train is removable, and mounted in slotted bracket 96 (Fig. 10), so that adjustment by substitution of different gears may effect different timing or quantity of rotations of shaft 90 as permitted by single rotation of shaft 85 by the snapping of arm 83 out of line of travel of the arm 84 for a single rotation of said arm. Shaft 90 has spline 97 thereon engaging the worm 98 to effect rotation of the worm wheel 99 and thereby cause intermittent rotation or stepping of the work holder or platform 100 for presenting new work, or a new portion of work to the next reciprocation of the tool. This work carrier or holder 100 is mounted on the non-rotary base 101, having lower block extension 102, engaged by the screw 103, whereby rotation of the stem 104 may adjust the table 100 horizontally toward or from the drill frame, which adjustment, the spline 97 of shaft 90 permits. The base 101, is mounted in the vertically adjustable base 101' which is guided in its upward and downward travel by the guide 101'' of the frame structure. Actuation of the base 101' is effected from pedestal 105 carrying the screw 106 driven through bevel gears 107, 108 from the shaft 109.

While this device as disclosed thus far is susceptible of most rapid automatic operation, the various cycles effected by devices mounted on shaft 33 may be multiple, thus making possible operation for greater output without increasing the speed of this shaft 33, while a plurality of tools may be readily actuated from the common drive shaft 28, by keying thereon a pinion 110 (Fig. 8) in mesh with a plurality of pinions 111 splined to shafts 112 parallel to shaft 28. The reciprocable non-rotary sleeves 51 may be combined by brackets 113 for common travel and rigidity as said sleeves are held for positive sliding by the guide wings 57. Set screws 55 coacting with flattened portions 56 of shafts 112 may adjust the distance of the cycle of movement of tools 114 to the work, while the reciprocation of these tools is effected with shaft 28 as actuated by cam 49.

The embodiment disclosed materially contributes to the production of a compact, efficient and simple machine, having a considerable range of adjustment in all phases to render it generally possible of adaptation to wide variations in work. The manual belt shifter and brake, permits of ready starting and stopping. The shiftable idlers, permits ready manual change of rotative speed of tool carrier shaft with automatic take up for belt. The removable cam, permits substitution of different and multiple cycle cams for varying the character of the work. Removable gears in speed reduction train from shaft 33, permits of ready speed variation for the slow rate or working travel of the cam drum. Adjustments of screw bolt attached cam termini 71 take care of the timing for high speed drum travel according to the feed travel distance in different classes or thicknesses of work, while positioning of the screw bolt attached lug 80 (Fig. 11) may allow of ready adjustment of the timing for indexing the work automatically while the tool is free therefrom. The extent of this indexing rotation of the vertically and horizontally adjustable work table or platform is readily varied by substitution of gears in the train, say by removing gear 88 and supplying one of different number of teeth. This indexing of the work table is possible for single or multiple tool work. By means of the set screw 55 coacting with flattened way 56, the tool carrier shaft may have its cycle of reciprocation as a whole adjusted toward or from the work, a convenience in mounting tools of different lengths, while no matter whether the shaft for tool travel is close to the work or more remote, the guide wings always serve effectually to maintain it in alined travel.

What is claimed and it is desired to secure by Letters Patent is:

1. A machine tool provided with a holder, means effecting reciprocation thereof comprising a sleeve coaxial with said holder and provided with means for holding said sleeve against relative endwise movement as to said holder, a cam drum for reciprocating said sleeve, driving mechanism for rotating the holder, and connecting means from said mechanism to drive the cam drum.

2. A machine tool provided with a holder, and means effecting reciprocation thereof comprising a pair of coaxial sleeves provided with holding means against relative endwise movement, one of which sleeves is rotated relatively to the other, and adjusting means for holding the last named sleeve in position as to the holder.

3. A machine tool provided with a holder, means effecting reciprocation thereof comprising a pair of coaxial sleeves mounted on the holder, said sleeves being provided with holding means against relative endwise movement, one of which sleeves is non-rotative, and driving means for the rotatable sleeve.

4. A machine tool provided with a rotary holder, and means effecting reciprocation of the holder comprising a sleeve mounted on the holder, said sleeve being coaxial with the holder, and adjusting means for varying the position of the sleeve relatively to the holder, said adjusting means being effective when set to preclude relative endwise movement between the holder and sleeve.

5. A plurality of tool carriers, a common support therefor, a work holder, driving mechanism providing relative rotation therebetween, and means effecting simultaneous reciprocation of the carrier relatively to the holder and eccentric thereto, comprising a cam and a member reciprocated by the cam and engaging said carriers.

6. A plurality of tool carriers, a common support therefor, an intermittently rotatable work holder, driving mechanism providing relative rotation therebetween, and means effecting simultaneous reciprocation of the carriers relatively to the holder and eccentric thereto.

7. A tool carrier member, a work holder member, driving mechanism providing relative rotation therebetween, said means effecting reciprocation between the holder and carrier, comprising a pair of sleeves for one of said members, one of which sleeves is provided with adjustable connections to the member and is surrounded by and is rotative relatively to the other sleeve.

8. A machine tool provided with a tool carrying element, an opposing work holding element, a driving shaft provided with driving connection for continuously rotating one of said elements, a cam drum parallel to the shaft, and a non-rotative sleeve on the shaft engaging the cam drum to reciprocate the continuously rotating shaft and its connected element.

9. A machine tool provided with a tool carrying element, an opposing work holding element, a reciprocable driving shaft member provided with driving connection for one of said elements, means for reciprocating said shaft member and its connected element, a fixed driving member for said shaft, and a driving connection between said members permitting variation in the alinement of said members, said connection comprising an element splined to one of said members and a relatively rockable element rotatively connected to the splined element and the other member.

10. A machine tool provided with a tool carrying element, an opposing work holding element, a mounting for one of said elements, and a driving device for the mounting comprising a continuously traveling belt, a stop, and a trip for releasing the stop.

11. A machine tool provided with a tool carrying element, a work holding element, opposing first and second relatively eccentric mountings for said elements, driving means for rotating the first mounting, a belt driven from said means and connected to the second mounting, a stop for holding the second mounting, and a trip for releasing the stop.

12. A machine tool provided with a tool carrying element, a work holding element, opposing first and second relatively eccentric mountings for said elements, a first driving means for rotating the first mounting, second driving means from said first driving means and connected to actuate the second mounting, a stop for holding the second mounting, and connections from the first mounting to trip the stop.

In testimony whereof I affix my signature in the presence of two witnesses.

GEORGE E. HALLENBECK.

Witnesses:
ELLIOTT HALLENBECK,
GEO. E. KIRK.